Oct. 7, 1969  K. A. PULLEN, JR  3,471,687
CHOPPER STABILIZED AMPLIFIER
Filed Oct. 11, 1968  3 Sheets-Sheet 1

KEATS A. PULLEN
INVENTOR

BY Harry M. Saragovitz,
Edward J. Kelly & Herbert Berl
ATTORNEYS

KEATS A. PULLEN
INVENTOR

Oct. 7, 1969
K. A. PULLEN, JR
3,471,687
CHOPPER STABILIZED AMPLIFIER
Filed Oct. 11, 1968
3 Sheets-Sheet 3
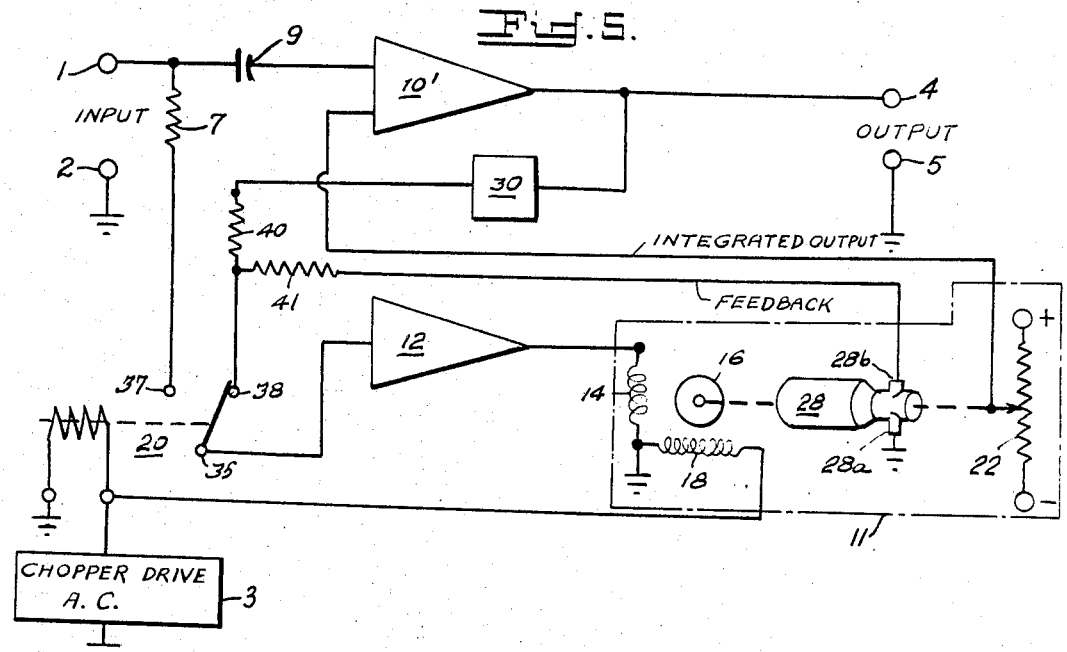
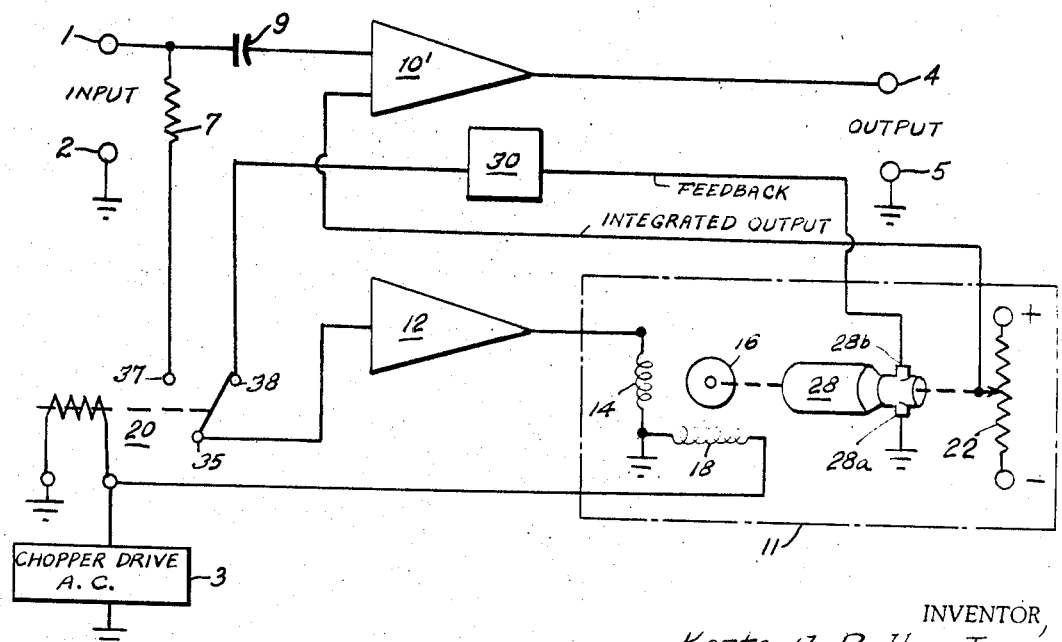
INVENTOR,
Keats H. Pullen, Jr.
BY: Harry M. Saragovitz,
Edward J. Kelly & Herbert Berl
ATTORNEYS

United States Patent Office 3,471,687
Patented Oct. 7, 1969

3,471,687
CHOPPER STABILIZED AMPLIFIER
Keats A. Pullen, Jr., Harford County, Md., assignor to the United States of America as represented by the Secretary of the Army
Continuation-in-part of application Ser. No. 395,340, Sept. 9, 1964. This application Oct. 11, 1968, Ser. No. 772,455
Int. Cl. G06g 7/18
U.S. Cl. 235—183                                 7 Claims

ABSTRACT OF THE DISCLOSURE

A stabilized amplifier of the chopper type wherein modulating means are driven in synchronism with an alternating voltage source for alternately applying an input signal and a feedback signal to the input of the amplifier and demodulating means operating in synchronism with the modulating means rectifies the A.C. output of the amplifier resulting in a pulsating direct current which is coupled to the input of a cathode follower and wherein an ideal integrator coupled between the output of the amplifier and the input of the cathode follower consists of a two phase motor coupled to a potentiometer having a reference voltage source connected thereacross. The motor has one winding excited by the alternating voltage source and another winding excited by the A.C. output of the amplifier whereby the rotor thereof is driven which in turn drives the potentiometer whereby a direct output potential proportional to the displacement of the rotor is obtained which is also coupled to the input of the cathode follower. The cathode follower supplies as the output the combined rectified output of the amplifier and the potential presented by the potentiometer. A feedback circuit couples the output of the cathode follower with the modulating means which applies said output as a feedback signal to the input of the amplifier. When the feedback signal voltage equals the input signal voltage no A.C. voltage appears at the output of the amplifier, the two phase motor stops rotating and a unipotential voltage identical to the input signal voltage exists at the output of the cathode follower.

---

The invention described herein may be manufactured, used, and licensed by or for the Government for governmental purposes without the payment to me of any royalty thereon.

This application is a continuation-in-part of my copending application Ser. No. 395,340, filed Sept. 9, 1964, now abandoned.

Feedback in operational amplifiers of the chopper type never quite achieves a balance as the frequency of the input voltage approaches D.C. (direct current). To overcome this in part, it has been the practice to use very high gain, expensive amplifiers and correspondingly great inverse feedback.

An integration network arranged as attributed to Goldberg and described in U.S. Letters Patent No. 2,684,999 is still another attempt to improve the situation. However, a practical limit is reached beyond which the integration capacitor becomes impossibly large and the loss in the resistor too great.

It is an object of this invention to provide a novel stabilizing arrangement for chopper amplifiers.

Another object of the invention is to provide an operational amplifier which more accurately and positively seeks a zero balance and in addition has a "memory" feature.

Still another object is to provide an electromechanical feedback and integrating means for chopper amplifiers.

Other objects and attendant advantages will become more readily apparent and understood from the following detailed specification and accompanying drawings in which like numerals identify like elements and in which:

FIGURE 5 is a schematic diagram of the amplifier of FIGURE 3 modified to include the tachometer generator for producing feedback for improved performance of the amplifier; and FIGURE 6 is a schematic diagram of the amplifier of FIGURE 3 further modified for improved performance in accordance with the invention.

A basic defect in stabilized amplifiers of the chopper type is the fact that it is impossible to achieve exact balance. This difficulty is a result of several things such as inequality of "on" periods of the choppers, accuracy of switching instants, and the particularly important fact that an unbalance is required for operation.

Figure 1:
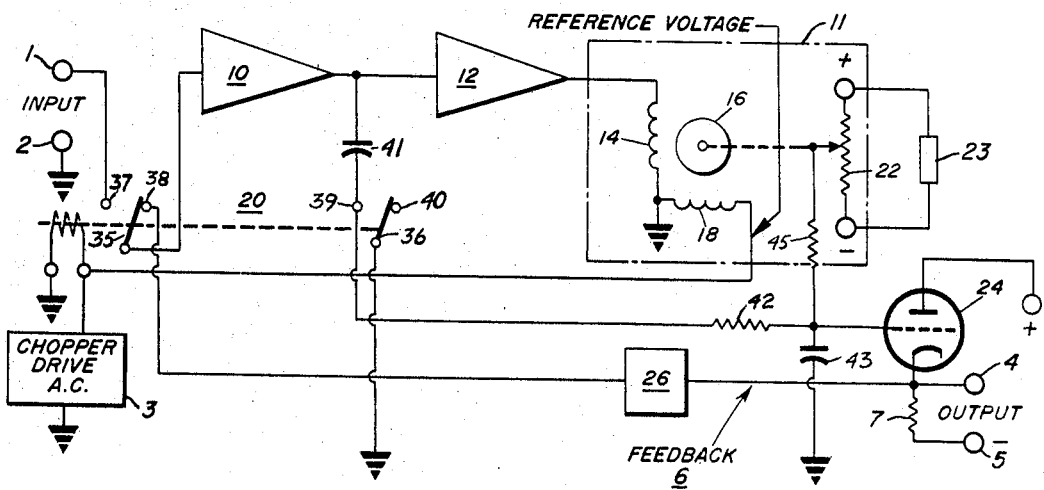
FIGURE 1 is a schematic diagram of an amplifier embodying principles of this invention.

The present invention introduces a balancing feature which within a short period reduces to zero the error in the output signal of the chopper stabilized amplifier shown in FIGURE 1.

The basic transfer function expressing the ratio of output to input voltage of electrical network of FIGURE 1 may be written as:

$$K_T = \frac{A}{1+AB} \quad (1)$$

A = forward amplification (open loop)
B = steady state feedback amplification and has a value of unity
$K_T$ = closed-loop amplification
upon taking $$A = A_0 \times \frac{a_1 s + b_1}{a_2 s + b_2} \quad (2)$$

Equation 1 may be rewritten in the form:

$$K_T = \frac{a_1 s + b_1}{a_2 s + b_2 + a_1 s + b_1} \quad (3)$$

when B has value of unity and new value of $a_1$ and $b_1$ are $A_0 \times$ the value in Equation 2.

$A_0$ = steady state forward amplification (open loop).
$a$ = relative value of energy storage element network which may be expressed in an electrical network as a capacitance or inductance.
$s$ = complex frequency parameter encountered in Laplace transformed analysis of electrical and mechanical systems.
$b$ = represents the value of energy dissipating elements such as a resistance in an electrical network.

For the value as $s \to 0$ ($t \to \infty$) to be exactly unity, $b_2 \equiv 0$. Under these conditions, A, Equation 2, reduces to $$A = A_0 \times \left(C_1 + \frac{d_1}{S}\right) \quad (4)$$

where:
$c_1 = a_1/a_2$
$d_1 = b_1/a_2$ or error elimination requires an ideal integration path between the input and output (forward loop). The value of $C_1$ may be arbitrary.

This process may be repeated. In the second step, a pair of pole-zero equalizers may be inserted, one in the forward loop and one in the feedback path. The new transfer function then is:

$$K_T \frac{\left(C_1+\frac{d_1}{s}\right)\left(\frac{a_3s+b_3}{a_4s+b_4}\right)}{1+\left(C_1+\frac{d_1}{s}\right)\left(\frac{a_3s+b_3}{a_4s+b_4}\right)\left(\frac{a_5s+b_5}{a_6s+b_6}\right)} \quad (5)$$

where the pole-zero equalizers have the transfer function:

$$\frac{a_3s+b_3}{a_4s+b_4}$$

[for forward loop of the chopper stabilized amplifier] and $$\frac{a_5s+b_5}{a_6s+b_6}$$

[for feedback loop of the chopper stabilized amplifier].

Expanding gives:

$$K_T = \frac{(C_1s+d_1)(a_3s+b_3)(a_6s+b_6)}{s(a_4s+b_4)(a_6s+b_5)+(C_1s+d_1)(a_3s+b_3)(a_5s+b_5)} \quad (6)$$

Conditions required for $K_T=1$, for $s \to 0$ are that $b_5=b_6$. Substituting gives:

$$K_T = \frac{(C_1s+d_1)(a_3s+b_3)(a_6s+b_6)}{s(a_4s+b_4)(a_6s+b_5)+(C_1s+d_1)(a_3s+b_3)(a_5s+b_5)} \quad (7)$$

Now for zero steady state (position) error, conditions are met.

For zero velocity error, the coefficients of $s$ in the numerator and denominator must be equal. Hence after cancelling terms we obtain:

$$C_1b_3b_5+a_3d_1b_5+a_6d_1b_3=b_4b_5+C_1b_3b_5+a_3d_1b_5$$
$$+a_5d_1b_3a_6d_1b_3-a_5d_1b_3=b_4b_5$$

or $$a_6(d_1b_3)=b_4b_5+a_5(d_1b_3)(a_6-a_5)(d_1b_3)=b_4b_5; \quad (7a)$$

since $b_4b_5>0$, $a_6>a_5$.

For a network to have the transfer function $$\frac{a_5s+b_5}{a_6s+b_5}=\frac{e_1s+1}{e_2s+1} \quad (8)$$

where $e_2>e_1$, $e_1=a_5/b_5$, $e_2=a_6/b_5$, the zero $s=-1/e_1$ is of greater magnitude than the pole $s=-1/e_2$.

Hence Equation 8 represents a low-pass network (as shown at 26 of FIGURE 1) since $$\frac{a_6-a_5}{b_5}=\frac{b_4}{d_1b_3}=e_2-e_1 \quad (9)$$

Clearly the amount of amplification required with the integrator whose coefficient is $d_1$ in equations above (for example as typified by components identified by reference numerals 14, 16, 18 and 22 in FIGURE 1) and the ratio of coefficients $b_3/b_4$ control the coefficient difference $e_2-e_1$ as defined in Equation 8. Also compensation for velocity error requires only a pole-zero low-pass network.

*For correction of acceleration error,* it is necessary that the coefficients $s$ and $s^2$ in the numerator and denominator of Equation 7 be equal. For this condition the two relations are:

For coefficient of $s$—

$$C_1b_3b_5+d_1a_6b_3+a_6d_1b_3=b_4b_5+b_4a_6+C_1b_3b_5$$
$$+d_1a_5b_3+d_1a_3b_5 \quad (10)$$

For coefficient of $s^2$ $$a_6(a_3d_1+b_3c_1)=a_4b_5+b_4a_6+a_5(a_3d_1+b_3C_1) \quad (11)$$

From Equation 11 by algebraic manipulation we obtain:

$$\frac{a_6-a_5}{b_5}\times(b_3C_1+d_1a_3)=\frac{a_6-a_5}{b_5}\times(C_1b_3+d_1a_3)=a_4+a_6\times\frac{b_4}{b_5} \quad (12)$$

Substituting Equation 9 in Equation 12 and simplifying:

$$(e_2-e_1)=\frac{1}{C_1b_3+a_3d_1}\times\left(a_4+a_6\times\frac{b_4}{b_5}\right)=\frac{b_4}{d_1b_3}$$

$$\frac{b_4}{d_1b_3}=\frac{1}{C_1b_3+d_1a_3}\times\left(a_4+\frac{a_6b_4}{b_5}\right) \quad (13)$$

Now if $b_4=mb_3$ (in Equation 13) wherein $m$ is a analytical scaling factor permitting determination of a type of network required.

$$\frac{m}{d_1}=\frac{1}{C_1b_3+d_1a_3}\times\left(a_4+a_6\frac{mb_3}{b_5}\right)$$

$$=\frac{1}{C_1b_3+d_1a_3}\times(a_4+e_2b_3m) \quad (14)$$

where $e_2=a_6/b_5$.

Solving for $m$:

$$m(C_1b_3+d_1a_3)=d_1a_4+me_2b_3d_1m(C_1b_3+d_1a_3$$
$$-e_2b_3d_1)=d_1a_4$$

$$m=\frac{d_1a_4}{C_1b_3+d_1a_3-e_2b_3d_1} \quad (15)$$

To determine the nature of the equalizing network required, for example, networks for introducing integration or differentiation of the signal applied thereto we also must know:

$$\frac{a_3s+b_3}{a_4s+mb_3}=\left[\frac{\frac{a_3}{b_3}\times 5+1}{\frac{a_4}{mb_3}\times 5\times 1}\right]\times\frac{1}{m}$$

Find the ratio of:

$$\frac{a_3}{b_3}\times\frac{mb_3}{a_4}=\frac{ma_3}{a_4}$$

From Equation 15

$$\frac{md_1a_3}{a_4}=d_1\left(1+\frac{m_2b_3e_2}{a_4}\right)-\frac{mc_1b_3}{a_4}$$

$$=d_1\left(1+me_2\frac{b_3}{a_4}\right)-\frac{mC_1b_3}{a_4}$$

$$=d_1+\frac{mb_3}{a_4}\times(e_2d_1-C_1)$$

or $$\frac{ma_3}{a_4}=1+\frac{mb_3}{a_4}\times\left(e_2-\frac{C_1}{d_1}\right) \quad (16)$$

If $$\frac{a_4}{m}<a_3; \frac{ma_3}{a_4}>1$$

but $$e_2=e_1+\frac{b_4}{d_1b_3} \therefore$$

$$\frac{ma_3}{a_4}=1+\frac{mb_3}{a_4}\times\left(e_1+\frac{b_4}{d_1b_3}-\frac{C_1}{d_1}\right)=1+\frac{mb_3}{a_4}\times\left[e_1+\frac{1}{d_1}\left(\frac{b_4}{b_3}-C_1\right)\right]$$

For $C_1=0$; then $$\frac{ma_3}{a_4}>1$$

Also for $$e_1=\frac{1}{d_1}\times\left(C_1-\frac{b_4}{b_3}\right)$$

then $$\frac{ma_3}{a_4}=1$$

or $$C_1=d_1e_1+\frac{b_4}{b_3}$$

now take $$\frac{b_4}{b_3}=n$$

Hence, if $c_1=d\cdot e_1+n$ and $$e_2=e_1+\frac{n}{d_1}$$

correction for steady state position, velocity and acceleration error have been made.

For $C_1=0$, then $$\frac{ma_3}{a_4}=1+\frac{mb_3}{a_4}\times\left(e_1+\frac{n}{d_1}\right) \qquad (17)$$

This requires a pole-zero network having a pole of greater magnitude than zero.

In regard to the above mathematical analysis:

*Zero steady state means* in the output voltage is the voltage exactly equal to the input voltage on an average basis of the amplifier of FIGURE 1.

*Zero velocity error* is the first derivative of the zero steady state condition or the rate of change of the output voltage is on the average exactly equal to the rate of change of the input voltage.

*Acceleration error* is the second derivative of the above-mentioned first derivative and is the error of the rate of rate of change of the output voltage as compared to the input voltage.

Now application of these principles to D.C. amplifiers and chopper stabilized amplifiers can be based on the foregoing analysis. Assuming that a standard tube or solid state stabilized amplifier is desired, a motor driven potentiometer may be used as the ideal integrator; it being inserted as in FIG. 1.

The schematic diagram of FIGURE 1 illustrates a preferred embodiment of the chopper stabilized amplifier of the invention wherein chopper 20, energized by the chopper drive A.C. source 3, is provided with synchronously driven switching elements 35 and its associated contacts 37 and 38 and 36 and its associated contacts 39 and 40 comprising a modulator and demodulator, respectively, as described hereinafter. Wide band operational amplifier 10 is in cascade with A.C. amplifier 12 and has its input connected to switching element 35. The input signal voltage is applied to input terminals 1 and 2 connected to contact 37 and ground, respectively. The ideal integrator 11 consists of a two-phase motor 16 having one winding 18 connected across the source of A.C. drive 3 which powers the chopper 20 and another winding 14 connected between the output of A.C. amplifier 12 and ground, and a potentiometer 22 which is provided with a source of potential 23 and has the rotating arm thereof mechanically coupled to the shaft of two-phase motor 16 for rotation therewith. The grid of cathode follower 24 is connected to the intermediate junction formed by the series connected resistor 42 and capacitor 43 forming a filter with the resistor terminal thereof connected through contact 39 to capacitor 41 which is coupled between contact 39 and the output of wide band operational amplifier 10, and the capacitor terminal thereof connected to ground. The filter thus formed by resistor 42 and capacitor 43 provides means for smoothing the unidirectional current generated by action of the demodulator means and eliminates noise due to switching action of element 36 of the demodulator. Resistor 45 connected between the arm of potentiometer 22 and capacitor 43 forms therewith a filter for noises generated by the potentiometer. The output of the chopper stabilized amplifier of the invention is available across the cathode resistor 7 through output terminals 4 and 5 connected thereto. The output of cathode follower 24 also provides a feedback signal to the input of operation amplifier 10 through low-pass filter network 26 connected between the cathode terminal of cathode follower 24 and contact 38 of the modulator means which applied it to the input of operational amplifier 10.

The operation of the chopper stabilized amplifier of the invention may be explained in relation to the schematic diagram of FIGURE 1 by assuming that chopper 20 and the winding 18 of two-phase motor are energized by the chopper drive A.C. source 3. When switching element 35 of the modulator means initially makes and breaks contact with contact 37 it changes the varying D.C. input signal applied to input terminals 1 and 2 of the chopper stabilized amplifier to a square wave and applies the square wave to the input of operational amplifier 10 where it is amplified and charges capacitor 41 and is further amplified by A.C. amplifier 12, the output of which is applied to winding 14 as a quadrature voltage, due to the design of chopper 20, 90° out of phase with respect to the voltage in winding 18 thereby causing the two-phase motor 16 to rotate and drive potentiometer 22. At the same time the demodulator through action of is switching element 36 with contact 39 connects the capacitor 41 between ground and the output of operational amplifier 10 whereupon it is charged by the output of the operational amplifier. When switching element 36 disengages contact 39 the capacitor 41 is coupled to the grid of cathode follower 24 through the filter consisting of resistor 42 and capacitor 43. By such switching action of switching element 36 in combination with capacitor 41 the square wave output of operational amplifier 10 is rectified producing a pulsating D.C. which is filtered by the filter comprising resistor 42 and capacitor 43, the capacitor 43 charging to bias the grid of cathode-follower 24 to adjust the output voltage available across cathode resistor 7 to a value closely equal to the value of the signal input voltage at contact 37. A feedback path 6 including a low-pass filter 26 therein connects the output voltage at the cathode terminal of cathode follower 24 to contact 38 whereby a feedback voltage is applied thereto. Switching element 35 due to its vibratory action in regards to contact 38 changes this feedback voltage to a square wave and applies it to the input of operational amplifier 10. From the foregoing it can be seen that the modulator changes both the varying D.C. input signal and the feedback signal to square waves whereby a square wave whose amplitude is equal to the difference between the input signal voltage and the output signal voltage (feedback) is generated and applied to the input of operational amplifier 10.

As the value of the output voltage at the output terminals 4 and 5 increases due to the charge in capacitor 43 increasing towards the value of the varying D.C. input signal voltage, the magnitude of the A.C. signal voltage (square wave) developed by operational amplifier 10 decreases correspondingly and would approach zero if operational amplifier 10 had infinite amplification. Since it cannot have infinite amplification there will exist a small unequality in the value of the varying D.C. input signal voltage (feedback at contact 37 resulting in a relatively small A.C. signal voltage at the output of operational amplifier 10 which is amplified by A.C. amplifier 12 and applied as a quadrature voltage to winding 14 causing the two-phase motor to rotate and drive the potentiometer 22 whereupon a bias voltage derived at potentiometer 22 is applied to the grid of cathode follower 24 through resistor 45 acting as a filter to reduce the small difference in values existing between the input varying D.C. voltage at contact 37 and the output voltage (feedback) at contact 38 to zero, it being understood that as long as there is an A.C. output at the output of A.C. amplifier 12 the two-phase motor will be driven by it. When the voltage on contact 37 and the voltage on contact 38 are equal no A.C. voltage (square wave) appears at the output of operational amplifier, the two-phase motor stops rotating and an unipotential signal voltage identical to the input signal voltage exists at the output of operational amplifier 10 and is available for use at the output of cathode follower 24.

As can be seen from the foregoing, the ideal integrator 11 with its associated circuits such as A.C. amplifier 12 may be operated by the chopper amplifier 10 as indicated in FIGURE 1 or it may be operated by the A.C. component of the rectified signal such as the rectified square wave produced by the demodulator means (elements 36–39–40). The demodulator means circuit provides the $A_0 \times C_1$ terms in Equation 4 and the ideal integrator 11, the $$A_0 \times \frac{d_1}{s}$$

terms. By proper adjustment of $C_1$, obtained by adjustment of the gain of operational amplifier 10, and by proper adjustment of $d_1$, obtained by adjustment of the gain of A.C. amplifier 12, or by changing the potentiometer applied voltage, and through the use of low-pass filter 26 in the feedback path 6 an accurate replica of the input signal is obtained at the output terminals 4–5 of cathode follower 24.

Figure 2:
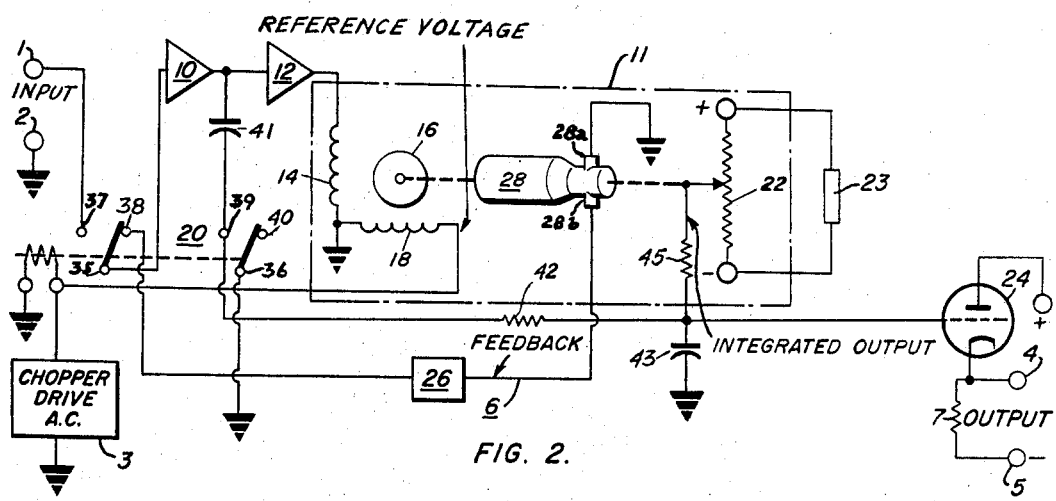
FIGURE 2 is a schematic diagram illustrating additional features which may be incorporated in the circuit of FIGURE 1.

FIGURE 2 illustrates schematically another means for obtaining a feedback voltage in the chopper amplifier of FIGURE 1 wherein a tachometer generator 28 is mechanically coupled to the two-phase motor 16 and potentiometer 22 for rotation therewith. In this modification the feedback signal voltage is obtained from tachometer generator 28, proportional to the speed thereof, instead of the output of cathode follower 24, the integrated output from potentiometer 22 being connected to the grid of cathode follower 24. In this way a velocity feedback stabilization is introduced and the position output signal at the cathode follower 24 output is the integral of the input signal. Tachometer generator terminal $28_a$ is connected to ground and the other terminal $28_b$ thereof is connected through low-pass filter 26 to contact 38 of the modulator means which functions as explained in connection with FIGURE 1 to alternately present the feedback voltage and input signal voltage as a square wave to the input of operational amplifier 10. As long as there is an A.C. signal in the output of operational amplifier 10 it is amplified by A.C. amplifier 12 the output of which drives the two-phase motor 16, as previously explained, whereupon tachometer generator 28 generates the feedback signal voltage and potentiometer 22 adjusts the bias on the grid of cathode follower 24. When the value of feedback voltage at contact 38 is equal to the value of the input signal voltage at contact 37, only an identical replica of the input signal voltage is present at the output of operational amplifier 10 and hence at the output of cathode follower 24. The modified ideal integrator 11 can be reset by shorting the input terminals 1 and 2 and transferring the feedback point (terminal $28_b$ of tachometer generator 28) to the cathode terminal (output terminal 4) of the cathode follower 24 in which case the two-phase motor 16 will drive potentiometer 22 to a null output voltage.

Figure 3:
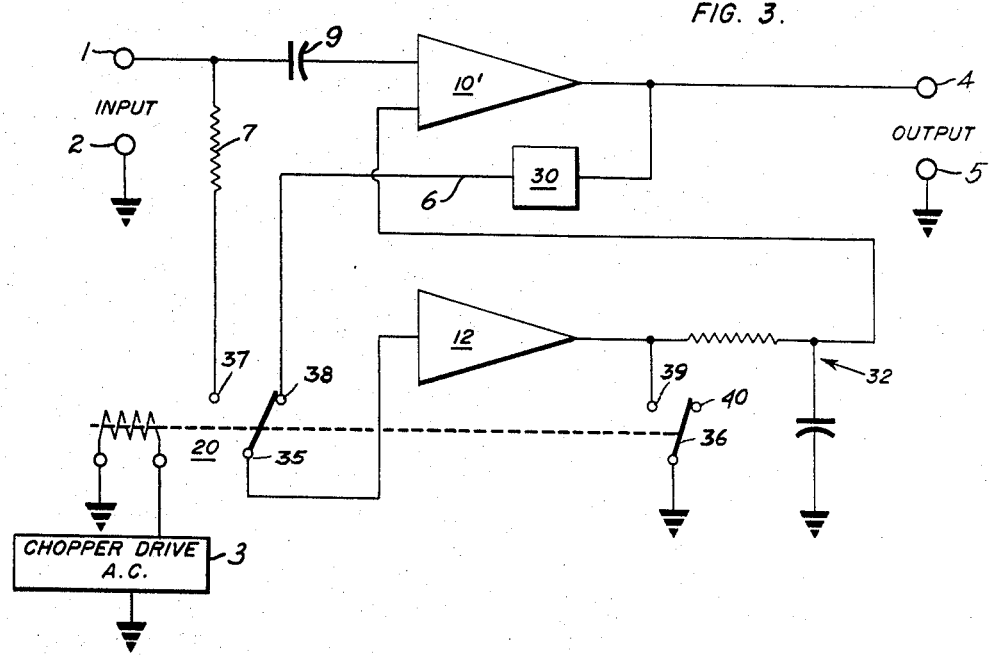
FIGURE 3 is a schematic diagram of a well known operational amplifier.

A schematic diagram of a basic Goldberg amplifier is shown in FIGURE 3 comprising the usual wideband amplifier $10^1$, A.C. amplifier 12 and D.C. integrator 32 connected between the output of A.C. amplifier 12 and an input of wideband amplifier $10^1$. The A.C. output of wideband amplifier $10^1$ is feedback by means of feedback loop 6 including low-pass filter 30 to chopper vibrator contact 38.

Figure 4:
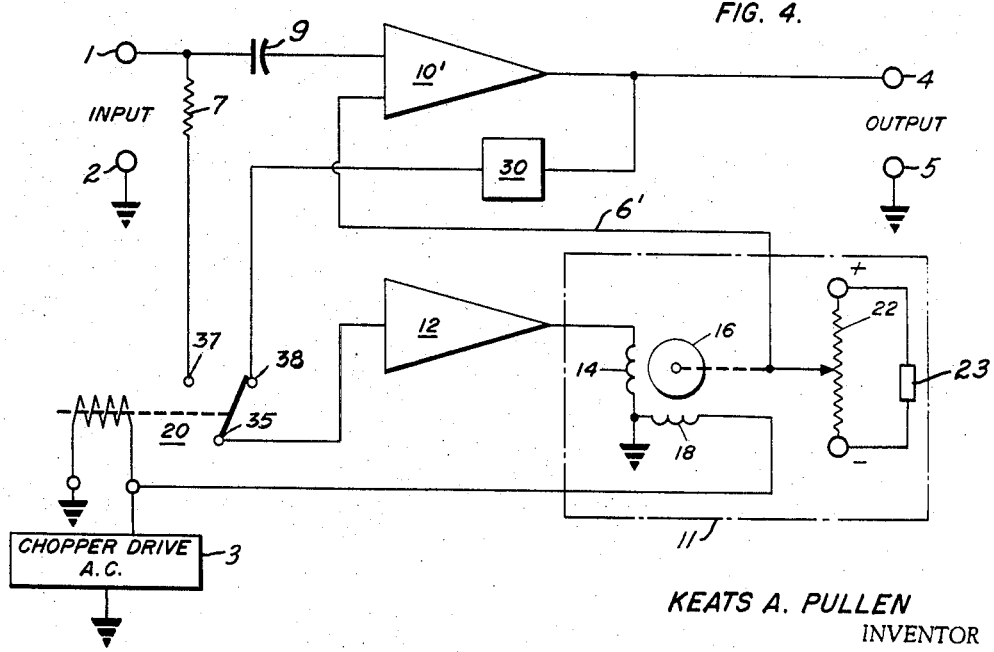
FIGURE 4 is a schematic diagram of the amplifier of FIGURE 3 modified for improved performance in accordance with the invention.

FIGURE 4 schematically shows the modification to the Goldberg amplifiers wherein the integrator 32 is replaced by the ideal integrator 11 for improved operation of the amplifier. It should be noted that the two-phase motor 16 of ideal integrator 11 can also be a D.C. motor assuming sufficient amplification is available to operate it so as to drive the potentiometer 22. The input signal applied to input terminals 1–2 is coupled to one input of wideband amplifier $10^1$ by capacitor 9 and the amplified output signal thereof to output terminals 4–5. A component, essentially D.C., of the input signal is shunted to contact 37 of chopper 20 through resistor 7 connecting terminal 1 and contact 37. The output of wideband amplifier $10^1$ is feedback to contact 38 of chopper 20 by means of a feedback loop including low-pass filter 30. Switching element 35 is connected to the input of A.C. amplifier 12 which has its output connected to winding 14 of the two-phase motor 16, and the arm of potentiometer 22 is connected to a second input of wideband amplifier $10^1$ by means of feedback loop 6. In operation, chopper 20 by means of its switching element 35 alternately contacting contacts 37 and 38 compares the input signal and the output signal of wideband amplifier $10^1$ and develops a square wave whose amplitude is equal to the voltage difference between the input signal and the output of wideband amplifier $10^1$ which is applied to the input of A.C. amplifier 12. This square wave is 90° out of phase with the voltage on winding 18 is then amplified by A.C. amplifier 12 and energizes winding 14 causing the two-phase motor 16 to rotate until the voltage difference between the input and output voltages of wideband amplifier $10^1$ averages to zero. Control feedback path $6^1$ applies voltages from potentiometer 22 to the second input of wideband amplifier $10^1$. Adjustment of the voltage on potentiometer 22 by two-phase motor 16 changes the voltage in wideband amplifier $10^1$ until an exact D.C. balance exists. Low-pass filter 30 coupling the output of operational amplifier 10 with contact 38 is provided to adjust transient response of the overall amplifier in the manner described in the mathematics "For correction for acceleration error."

In FIGURE 5 the R-C integrator 32 of the Goldberg amplifier is replaced by the ideal integrator 11 utilizing the tachometer generator 28 as described in connection with FIGURE 2, instead of feeding back by means of potentiometer 22 and related circuitry. In this modification, the output of wideband amplifier $10^1$ is coupled through low-pass filter 30 to resistor 40 of summing means comprising series connected resistors 40 and 41 and the feedback from tachometer generator 28 is connected to resistor 41. The intermediate point of the series connected resistors is returned to contact 38. In this arrangement the chopper 20 compares the summed signal voltage of the signal output voltage of wideband amplifier $10^1$ and the tachometer generator 28 feedback signal voltage with the input signal voltage at contact 37 and generates a square wave whose amplitude is equal to the voltage difference between the input signal voltage and the summed signal voltage which is applied to the input of A.C. amplifier 12, the output of which excites winding 14 causing two-phase motor 16 to drive tachometer generator 28 and potentiometer 22 whereby a feedback voltage is applied to the second input of wideband amplifier $10^1$ and an integrated output voltage is applied to resistor 40. The two-phase motor 16 drives tachometer 25 and potentiometer 22 until the voltage difference between the input signal voltage and the summed signal averages to zero.

FIGURE 6 is a schematic illustration of a modification of FIGURE 5 wherein the chopper 20 compares the feedback signal from tachometer generator 28 with the input signal voltage. In this modification the tachometer generator terminal 28b is coupled through low-pass 30 to contact 38 and the chopper 20 functions as disclosed in the foregoing to generate a square wave whose amplitude is equal to the voltage difference between the input signal voltage and the feedback voltage from tachometer 28 to drive two-phase motor 16 until the voltage difference between these two signals averages to zero as described in the foregoing.

Thus, by using a motor-potentiometer combination, stabilization of standard wideband amplifiers has been achieved by controlling the conventional D.C. balance control. The above arrangements, eliminate the usual offset, that is, the difference that exists when the output is almost but not exactly identical with the amplifier input, by correcting the amplifier adjustments on a continuous ideal basis. Additionally, noise effects are averaged out giving greatly improved D.C. stability to the associated D.C. amplifier system. This condition of "almost-balance" associated with the usual R-C integrator is replaced with a condition of true bridge-balance on an A.C. basis and a differencing of two large values of D.C. is replaced by a mean-square average of an A.C. value.

The U.S. patent to Williams, No. 2,919,409, issued Dec. 29, 1959, for "System for Adjusting Amplifiers," teaches apparatus for the simplest condition of position error correction, but such apparatus does not correct for velocity, acceleration, or higher order errors as is possible with the present chopper stabilized system.

In some applications where a very high precision output is desired using the amplifier schematically shown in FIGURE 2 as an integrator and wherein feedback is obtained by means of tachometer generator 28, the cathode follower 24 may be replaced by the amplifier illustrated in FIGURE 1 with the output of the potentiometer of FIGURE 2 coupled to the input thereof.

What is claimed is:

1. A stabilized operational amplifier comprising, amplifying means, modulating means driven in synchronism with the output of a reference alternating voltage source for alternately applying an input signal and a feedback signal to said amplifying means, a motor of the two phase induction type having one winding energized by the reference voltage source and a second control winding energized by the alternating output of said amplifying means, demodulating means operating in synchronism with said modulating means for rectifying the output of said amplifying means, a potentiometer energized by a direct voltage source and having the arm thereof variably positioned by said motor, a direct coupled output circuit for supplying as the output of said operational amplifier the combined rectifier output of said amplifier means and the potential present at the arm of said potentiometer, and a feedback network connected to said direct coupled output circuit and supplying feedback signal to said modulating means.

2. An operational amplifier as claimed in claim 1, wherein said feedback network includes an electrical filter network for reducing higher order errors exactly to zero.

3. A stabilized operational amplifier comprising, amplifying means, modulating means driven in synchronism with the output of a reference alternating voltage source for alternately applying an input signal and a feedback signal to said amplifying means, a motor of the two phase induction type having one winding energized by the reference voltage source and a second winding energized by the alternating output of said amplifier means, demodulating means operating in synchronism with said modulating means for rectifying the output of said amplifying means, a potentiometer energized by a direct voltage source and having the arm thereof variably positioned by said motor, a direct coupled output circuit for supplying as the output of said operational amplifier the combined rectified output of said amplifying means and the potential present at the arm of said potentiometer, a tachometer generator driven by said motor for generating a feedback signal proportional to the speed of said motor and a feedback network comprising a low-pass filter coupling the output of said tachometer generator to said modulating means whereby a feedback signal is applied to said modulating means.

4. An operational amplifier of improved stability characteristics, comprising, a first amplifier, an electromechanical modulator driven by an alternating current source and including two sets of synchronously vibrating contacts, one set of which applies to said first amplifier, in alternation an input signal to said first amplifier and a feedback signal, the other set of which rectifies the output of said first amplifier, a second amplifier for amplifying the unrectified output of said first amplifier, a motor controlled by the output of said second amplifier, a potentiometer connected to a reference potential source and having an adjustable arm positioned by said motor and providing a direct output potential proportional to the rotational displacement of said motor, a direct coupled output circuit for combining the output potential of said potentiometer and the rectified output of said first amplifier to provide the output of said operational amplifier, and a feedback network having as its input said operational amplifier output and providing the feedback signal to said modulator.

5. An operational amplifier of improved stability characteristics comprising, a first amplifier, an electromechanical modulator driven by an alternating current source and including two sets of synchronously vibrating contacts, one set of which applies to said first amplifier, in alternation an input signal to said first amplifier and a feedback signal, the other set of which rectifies the output of said first amplifier, a second amplifier for amplifying the unrectified output of said first amplifier, a motor controlled by the output of said second amplifier, a potentiometer connected to a reference potential source and having an adjustable arm positioned by said motor and providing a direct output potential proportional to the rotational displacement of said motor, a direct coupled output circuit for combining the output potential of said potentiometer and the rectified output of said first amplifier to provide the output of said operational amplifier, a direct current generator driven by said motor to provide a direct output voltage comprising a feedback signal, and a low-pass filter for reducing higher order errors to a minimum coupling said feedback signal to said one set of synchronously vibrating contacts.

6. An integrating amplifier for use in computers, comprising a first amplifier, first switching means operating in synchronism with an alternating voltage source for applying to said first amplifier an input signal to be integrated and a feedback signal, second switching means operating in synchronism with said first switching means for rectifying the output of said first amplifier, an integrating capacitor to which the rectified output of said first amplifier is applied, a second amplifier for amplifying the unrectified output of said first amplifier, a motor controlled by the output of said second amplifier, a potentiometer connected across a source of direct voltage and having an adjustable arm driven by said motor to provide a voltage at said arm proportional to the integrated output of said first amplifier, a direct coupled output stage combining the voltage at the arm of said potentiometer with the voltage across said capacitor to provide the integral of said input signal, a direct current generator driven by said motor to provide a direct voltage proportional to the speed of said motor comprising a feedback signal, and a feedback network connected to said motor and said first switching means for supplying said feedback signal to said first switching means.

7. An integrating amplifier as claimed in claim 6 wherein said feedback network includes an electrical network for reducing higher order errors to zero.

References Cited

UNITED STATES PATENTS

| | | | |
|---|---|---|---|
| 2,856,468 | 10/1958 | Berry | 330—9 X |
| 3,070,786 | 12/1962 | McIntyre | 340—347 |
| 3,237,117 | 2/1966 | Collings et al. | 330—9 |

MALCOLM A. MORRISON, Primary Examiner

FELIX D. GRUBER, Assistant Examiner

U.S. Cl. X.R.

328—127; 330—9; 340—347